United States Patent [19]
Gotanda et al.

[11] Patent Number: 5,546,121
[45] Date of Patent: Aug. 13, 1996

[54] SYSTEM FOR AND METHOD OF TAKING PICTURE

[75] Inventors: Yoshiharu Gotanda; Minoru Arai; Izumi Miyake, all of Asaka, Japan

[73] Assignee: Fuji Photo Film Co., Ltd., Kanagawa, Japan

[21] Appl. No.: 235,518

[22] Filed: Apr. 29, 1994

[30] Foreign Application Priority Data

Apr. 30, 1993 [JP] Japan .................................. 5-124754

[51] Int. Cl.$^6$ ........................... G03B 29/00; G03B 15/02
[52] U.S. Cl. ............................. 348/64; 348/371; 354/75; 354/76; 354/129
[58] Field of Search .............................. 354/75, 76, 129; 348/64, 371

[56] References Cited

U.S. PATENT DOCUMENTS

| | | |
|---|---|---|
| 4,805,037 | 2/1989 | Noble et al. . |
| 4,920,371 | 4/1990 | Kaneko . |
| 5,006,871 | 4/1991 | Noble . |
| 5,008,697 | 4/1991 | Noble . |
| 5,307,168 | 4/1994 | Tashiro . |
| 5,389,984 | 2/1995 | Lovenheim . |

*Primary Examiner*—David M. Gray
*Assistant Examiner*—Daniel Chapik

[57] ABSTRACT

A picture-taking system includes a film camera for capturing a photographic image of a subject on photosensitive film, and a video camera having a solid-state electronic image sensing device 12, for outputting a video signal representing the photographic image of the subject. Essentially the same photographic image of the subject is photographed by both the film camera and the video camera under a single strobe flash generated by a strobe light-emission device 40. To achieve this synchronized photography and simplify the synchronized photography control system, it is arranged so that the video camera responds to a photographic trigger signal from a shutter switch by generating, and applying to the film camera, a shutter release signal the vertical synchronizing signal of the video camera as a reference. The shutter of the film camera starts opening in response to the shutter release signal. Upon passage of a fixed time up to the moment at which the shutter is opened fully, the video camera generates an electronic-shutter control signal using its vertical synchronizing signal as a reference and initiates exposure of the solid-state electronic image sensing device. Immediately thereafter, the video camera applies a strobe fire-permitting signal to the strobe light-emission device to fire a strobe flash.

11 Claims, 4 Drawing Sheets

SYSTEM FOR AND METHOD OF TAKING PICTURE

BACKGROUND OF THE INVENTION

1. Field of the Invention

This invention relates to a picture-taking system, as well as a picture taking method, equipped with a film camera for capturing the photographic image of a subject on a photosensitive film, and a video camera, which includes a solid-state electronic image sensing device, for outputting a video signal that represents the photographic image of the subject, wherein substantially identical optical images of the subject are captured by both the film camera and the video camera under a single flash of a strobe generated by a strobe light-emitting device.

2. Description of the Background Art

Picture-taking systems of this kind are used with great effectiveness in photographic halls and studios in order to verify whether the desired video has been obtained before developing or printing a film on which an image has been captured by a film camera. This is achieved by reproducing the video signal obtained from the video camera on a monitor display such as a television so that the picture may be displayed in advance of development or printing. What is of prime importance in such a picture-taking system is that essentially the same photographic image be obtained in both the film camera and video camera. If this is not accomplished, the reproduced image based upon the output video signal of the video camera will be of no help whatsoever.

In order to obtain essentially the same photographic image in both the film and video cameras, it is required that both cameras perform exposure simultaneously. In the photography of portraits or the like indoors such as in a photographic studio, a strobe is fired for exposure. Since exposure in the cameras is essentially governed by the time at which the strobe is fired, simultaneous exposure in these two types of cameras is possible if use is made of strobe illumination.

An important problem to be referred to is that a video camera operates in accordance with a synchronizing signal of a fixed period (e.g., a vertical synchronizing signal). In accordance with the NTSC (National Television System Committee) method, one period of a vertical synchronizing signal is 1/60 of a second (about 16.7 ms), and one field of a video signal is produced within this period. Accordingly, the operating period of the video camera must conform to strobe firing timing.

The principal camera employed in the above-described picture-taking system is a film camera. The purpose of the system is to acquire a film photograph that is satisfactory, and the video camera is nothing more than a means of confirming whether the film photograph is suitable or not.

For this reason, the idea that has prevailed heretofore is that it is important that the strobe be fired and the picture taken by the film camera in accordance with the timing at which a shutter-release button on the film camera is pressed. According to the conventional picture-taking system or method, the generally accepted technical concept is to set (synchronize) the operation of the video camera to the picture-taking timing of the film camera.

For example, according to U.S. Pat. No. 4,805,037, a strobe is fired immediately in response to operation of the shutter button on the film camera, thereby capturing the image of the subject by the film camera. A synchronizing device is provided for synchronizing the operation of the video camera to that of the film camera in such a manner that the video camera will take a picture identical with that taken by the film camera.

A system and method representing an improvement on the system of the above-mentioned literature are described in U.S. Pat. No. 5,006,871 and U.S. Pat. No. 5,008,697. In the former, the timing of the light emission of a strobe device is controlled by generating a flash fire signal based upon AND logic between the flash request signal output by the film camera and a flash valid signal output by the video camera. The latter is for preventing transfer of signal charge (the video signal) out of a solid-state electronic image sensing device for the duration of strobe illumination. In order to accomplish this, a synchronizing circuit is provided to interrupt the readout of signal charge from the solid-state electronic image sensing device in response to the flash request signal from the film camera and reset a synchronizing signal generating circuit following the conclusion of flash illumination to start the transfer of signal charge.

In either case, to the extent that these systems are based upon an approach that causes operation in the video camera to follow up and become synchronized to the picture-taking operation in the film camera and strobe illumination under the control of the film camera, the need for measures to set the operation of the video camera to the operation of the film camera, as well as some circuit means or other for achieving this, is unavoidable.

SUMMARY OF THE INVENTION

The present invention seeks to synchronize the operation of the film camera to the operation of the video camera, based upon a concept which is entirely contrary to that of the conventional systems, to make possible synchronous photography in both cameras. Moreover, the invention seeks to simplify control for this purpose.

A picture-taking system according to the present invention comprises a video camera having a solid-state electronic image sensing device, a vertical synchronizing signal generating circuit for generating a vertical synchronizing signal that defines one field period in the video camera, and a field-shift signal generating circuit means responsive to an electronic-shutter control signal for generating a field-shift signal that defines exposure time of the solid-state electronic image sensing device using the vertical synchronizing signal as a reference, wherein a video signal representing a photographic image of a subject is output by the solid-state electronic image sensing device in response to the field-shift signal; a film camera, which has a shutter, for capturing on photographic film the photographic image of the subject incident thereon when the shutter is released in response to a shutter release signal; a shutter switch for entering a photographic trigger signal; and a strobe light-emission device for firing a strobe flash in response to a strobe-fire permitting signal.

The video camera is provided with a synchronous control circuit for generating the shutter release signal using the vertical synchronizing signal as a reference in response to a photographic trigger signal that enters the video camera from the shutter switch, generating an electronic-shutter control signal using the vertical synchronizing signal as a reference in such a manner that the solid-state electronic image sensing device is exposed to light in a time zone that the shutter, which is released in response to the shutter release signal, is fully open, and generating the strobe-fire permitting signal in such a manner that the strobe light-emission device fires the strobe flash during exposure of the solid-state electronic image sensing device to light.

The present invention provides a picture-taking method in a picture-taking system which includes a video camera having a solid-state electronic image sensing device, a vertical synchronizing signal generating circuit for generating a vertical synchronizing signal that defines one field period in the video camera, and a field-shift signal generating circuit responsive to an electronic-shutter control signal for generating a field-shift signal that defines exposure time of the solid-state electronic image sensing device using the vertical synchronizing signal as a reference, wherein a video signal representing a photographic image of a subject is output by the solid-state electronic image sensing device in response to the field-shift signal, a film camera, which has a shutter, for capturing on photographic film the photographic image of the subject incident thereon when the shutter is released in response to a shutter release signal, a shutter switch for entering a photographic trigger signal, and a strobe light-emission device for firing a strobe flash in response to a strobe-fire permitting signal, the method comprising a step of measuring in advance a delay time from a moment at which the shutter release signal is applied to a moment at which the shutter is opened fully in response to the shutter release signal; a step of setting time from generation of the shutter release signal to generation of an electronic-shutter control signal to a time corresponding to the delay time; and a step of causing the video camera to generate the shutter release signal, the electronic-shutter control signal and the strobe-fire permitting signal, using the vertical synchronizing signal as a reference, in response to a photographic trigger signal generated by the shutter switch, in such a manner that the solid-state electronic image sensing device is exposed to light in a time zone that the shutter, which is released in response to the shutter release signal, is fully open, and such that the strobe-light emission device fires the strobe in response to the strobe-fire permitting signal during exposure of the solid-state electronic image sensing device to light.

In accordance with the present invention, operation of the film camera and strobe light emission device is synchronized to the video camera using as a reference the operation of the video camera, which is operating in synchronism with the vertical synchronizing signal. Since the video camera originally comes equipped with a synchronous control circuit for controlling the operation of the video camera, the synchronizing control circuit need only be additionally furnished with a function for generating the shutter release signal used to control the operation of the film camera and the strobe-fire permitting signal used to control the light emission from the strobe light-emission device. This simplifies the system configuration because overall synchronous control of the system can be managed in a centralized manner.

Preferably, use is made of a solid-state electronic image sensing device suited to pseudo-frame photography, and it is so arranged that exposure of the solid-state electronic image sensing device is completed within the interval of one field. As a result, photography in the video camera ends in the interval of one field, and a video signal representing the frame picture is obtained. This makes it possible to reproduce instantaneous, high-quality video.

In a preferred embodiment of the picture-taking system according to this invention, the video camera is provided with a delay-time setting unit for setting a delay time from a moment at which the shutter release signal is applied to a moment at which the shutter is opened fully in the film camera. The synchronous control circuit generates the shutter release signal and the electronic-shutter control signal on the basis of the delay time set in the delay-time setting unit.

As a result, various types of film cameras having different delay times from application of the shutter release signal to full opening of the shutter can be used.

The above-mentioned delay time preferably is measured by applying the shutter release signal to the film camera, accepting the strobe-fire permitting signal generated by the film camera in response to this shutter release signal, and clocking the time from the moment at which the shutter release signal is applied to the moment at which the strobe-fire permitting signal is received, with the period of the vertical synchronizing signal serving as the unit of measurement.

The present invention will become more fully understood from the detailed description given hereinbelow and the accompanying drawings which are given by way of illustration only, and thus, are not limitative of the present invention and wherein:

DESCRIPTION OF THE PREFERRED EMBODIMENT

Figure 1:
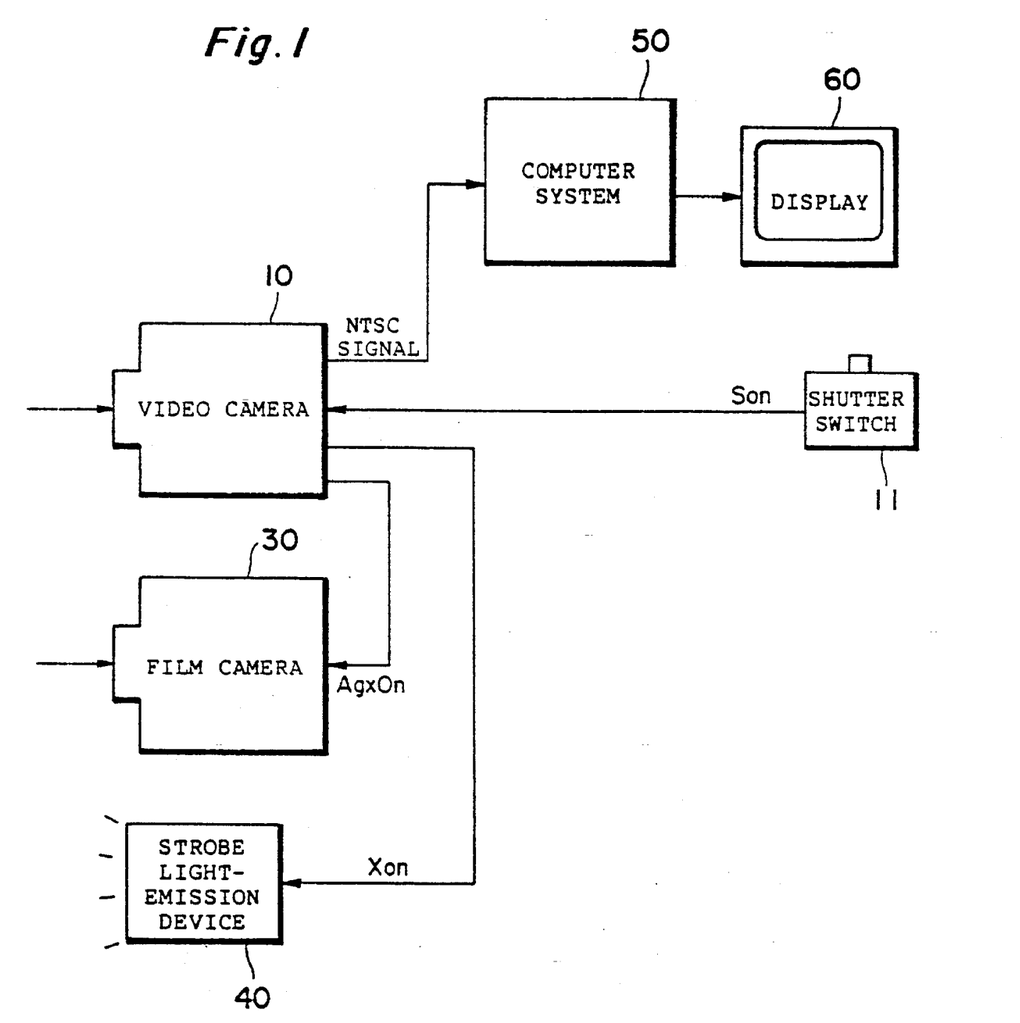
FIG. 1 is a block diagram showing the overall configuration of a picture-taking system.

FIG. 1 illustrates the overall configuration of the picture-taking system.

The picture-taking system includes a video camera 10 having a still mode for outputting one frame of a still-video signal (in general, one frame is equal to two fields) representing the image of a subject, a film camera 30 for capturing the image of the subject on photosensitive film (silver-halide film), a strobe light-emission device 40 for firing a strobe flash, a shutter switch 11 used by the photographer to apply the photographic timing, and a monitor display unit 60 representing a still picture taken by the video camera 10. According to this embodiment, a computer system (e.g., a so-called personal computer) 50 is connected to the video camera 10. Display of the still picture on the monitor display unit 60 is controlled by the computer system 50.

The video camera 10 is placed close to the film camera 30 in such a manner that it will be capable of capturing an image of a subject, which is identical with the image of the subject captured by the film camera 30, under substantially the same conditions and in substantially the same environment. For example, the video camera 10 is disposed above or under the film camera 30. Preferably an arrangement may be adopted in which the image pick-up lens system of the video camera 10 is operatively linked to the image pick-up lens system of the film camera 30. As a result, if a focusing operation and exposure adjusting operation are performed at the film camera 30, the same photographic conditions will be set in the video camera 10 automatically. The same is true in a case where the image pick-up lens system is provided with a zoom lens. It is also possible to adopt an arrangement in which the incident optical image of the subject is split in half by a beam splitter and applied to the video camera 10 and film camera 30. One strobe light-emission device 40 (or a plurality thereof) is provided at a position where it will illuminate the subject appropriately. There are occasions where only a plurality of light-emitting tubes are provided. The shutter switch 11 is connected to the video camera 10. Preferably, a comparatively long cord is used in order to connect the shutter switch 11 to the video camera 10 in such a manner that the photographer can take a picture anywhere while holding the shutter switch. Of course, it may be so arranged that the shutter switch is provided inside the video camera 10, and displacement of a shutter button, which is on the outside of the video camera 10, by depression is mechanically transmitted to the shutter switch, whereby the shutter switch is turned on by depression of the shutter button.

The video camera 10 is equipped with a solid-state electronic image sensing device such as a CCD, and a synchronizing signal generating circuit. The latter generates a vertical synchronizing signal, a horizontal synchronizing signal and other timing signals. Various operations in the video camera 10, especially the photographic operation in the solid-state electronic image sensing device (the so-called electronic shutter operation and readout operation), are performed in synchronization to these synchronizing signals. Further, the video signal obtained by photography is output upon being converted to a signal based upon the NTSC system from the video camera 10. The film camera 30 has a shutter, e.g., a focal-plane shutter, which starts a shutter release operation in response to a shutter release signal AgxOn. Delay time from the moment the shutter starts the shutter release to the moment the shutter is opened fully is known in advance. The strobe light-emission device 40 generates a flash in response to a strobe-fire permitting signal Xon.

Synchronization of the operations of the video camera 10, the film camera 30 and the strobe light-emission device 40 is achieved as follows, stated in simple terms: When the shutter switch 11 is turned on by the photographer at an arbitrary time, the shutter switch 11 generates a photographic trigger signal Son and applies it to the video camera 10. The latter operates at the periods of the aforementioned synchronizing signals, particularly the period of the vertical synchronizing signal. Upon receiving the photographic trigger signal Son, the video camera 10 generates the shutter release signal AgxOn at a timing synchronized to an appropriate vertical synchronizing signal which appears after the trigger signal. The shutter release signal AgxOn is applied to the film camera 30 as the equivalent of the shutter release signal (photographic trigger signal) applied to the conventional film camera by the shutter release button. The film camera 30 starts the shutter release operation in response to this shutter release signal AgxOn.

The delay time from the start of the shutter release operation to full opening of the shutter is set in the video camera 10 beforehand as time which is a positive whole-number multiple of the period (the vertical scanning interval, which generally is 1/60 of a second) of the vertical synchronizing signal. After outputting the shutter release signal AgxOn, the video camera 10 starts the photographic operation (electronic shutter release operation) by the solid-state electronic image sensing device in synchronization with the vertical synchronizing signal that appears at the moment the aforesaid delay time elapses and, at substantially the same time, outputs the strobe-fire permitting signal Xon and applies it to the strobe light-emission device 40. The latter fires the strobe flash in response to the strobe-fire permitting signal Xon. Accordingly, the solid-state electronic image sensing device in the video camera and the film in the film camera 30 whose shutter is in the fully open state are exposed simultaneously by the strobe flash. Preferably, the photographic operation in the video camera 10 ends during one vertical scanning interval according to the pseudo-frame system, described later.

The length of time over which the strobe flash is fired is shorter than 1/60 of a second, and the exposure in the video camera 10 and film camera 30 is essentially decided by the strobe flash. The shutter should be kept fully open at least for the duration of strobe illumination in the film camera 30. Exposure time (electronic shutter speed) in the video camera 10 is about 1/60 of a second. If the shutter speed (exposure time) in the film camera 30 is made more than 1/30 of a second, then the shutter of the film camera 30 will be maintained substantially fully open for the time of 1/60 of a second during which exposure is being performed in the video camera 10, even if the maximum error produced when the above-mentioned delay time is stipulated as being a whole-number multiple of 1/60 of a second is taken into consideration.

One frame (two fields) of the video signal output by the solid-state electronic imaging device of the video camera 10 is converted to the NTSC format, output by the video camera 10 and applied to the computer system 50. The computer system 50 converts the entering video signal to digital image data and stores this image data in its memory. The digital image data that has been stored in the memory is applied to the monitor display unit 60 upon being converted to an analog video signal. As a result, the captured still picture is displayed on the screen of the display unit 60. Since the computer system 50 continuously outputs the same video signal at the period of one frame, the still picture continues to be displayed on the display unit 60.

Thus, photography of the subject is performed perfectly simultaneously in both the film camera 30 and video camera 10, and the image of the subject captured by the video camera 10 is displayed on the display unit 60. This makes it possible to judge, by way of the display, the suitability or unsuitability of the photograph taken by the film camera 10.

The construction and operation described above in simple terms will now be set forth in detail with reference to FIGS. 2 and 3.

According to this embodiment, the video camera 10 employs a frame interline-transfer FITCCD 12 capable of pseudo-frame photography. The flow of processing of one frame of the video signal outputted by the FITCCD 12 is as follows:

The output video signal from the FITCCD 12 is subjected to preprocessing such as preamplification and white-balance adjustment in a signal preprocessing circuit 13. The gain of an amplifier circuit contained in the preprocessing circuit 13 is controlled by a main controller 20. The output video signal from the preprocessing circuit 13 is fed into a digital signal processing circuit 16 upon being converted to digital image data by an A/D converting circuit 14. The digital signal processing circuit 16 subjects the input digital image data to a gamma correction and to processing for conversion to luminance Y and color data R, G, B. The circuit 16 is controlled by a signal processing control circuit 21 constituted by a microcomputer (which includes a memory). The image data processed by the digital signal processing circuit 16 is returned to an analog video signal and then applied to an encoder 18 by a D/A converting circuit 17. The encoder 18 outputs the input video signal upon converting it to a signal in the NTSC format. An analog signal processing circuit may be substituted for the image processing circuit 16. In such case the A/D converting circuit 14 and D/A converting circuit 17 will be unnecessary. The encoder 18 may output luminance signals, color signals and video signals in other formats, not just NTSC signals.

The video camera 10 further includes a synchronizing signal generating circuit 15 and the main controller 20. The synchronizing signal generating circuit 15 generates a vertical synchronizing reference signal VD, a horizontal synchronizing reference signal and a field index signal FI, etc., and then applies these signals to the main controller 20 and other circuits. The vertical synchronizing reference signal VD is a signal which is the inverse of the vertical synchronizing signal. The field index signal FI is a signal inverted at the field period for identifying two fields, namely an A field and a B field, in interlace scanning. The synchronizing signal generating circuit 15 further generates field-shift signals FA, FB, as well as synchronizing signals, such as high-speed transfer pulses and pixel clock pulses, for driving the FITCCD 12, and applies these signals to the FITCCD 12. Furthermore, in response to an electronic-shutter control signal TS provided by the main controller 20, the circuit 15 generates the strobe-fire permitting signal Xon and applies this signal to the main controller 20. It may be so arranged that the strobe-fire permitting signal Xon is generated by the main controller 20.

The main controller 20 preferably is constituted by a microcomputer (which includes a memory) and exercises general control over all operations in the video camera 10 inclusive of control of the signal preprocessing circuit 13 and control of the signal processing control circuit 21 through communication with this circuit. In connection with this embodiment, the main controller 20 operates to generate the shutter release signal AgxOn in response to the photographic trigger signal Son from the shutter switch 11, to generate the electronic-shutter control signal TS while managing the above-mentioned delay time, and to deliver the strobe-fire permitting signal Xon in response to the strobe-fire permitting signal Xon from the synchronizing signal generating circuit 15.

According to this embodiment, a delay time Td from the moment the film camera 30 accepts the shutter release signal AgxOn to the moment the shutter of the film camera attains the fully opened state has been set to 1 VD (where 1 VD is one vertical scanning interval, which is equal to 1/60 of a second). Further, exposure (electronic shutter operation) in the FITCCD 12 is always carried out at in a B field, and readout of signal charge (the video signal) from the FITCCD 12 is performed only in the set of A and B fields that immediately follow the above-mentioned B field.

Assume that the photographer has operated the shutter switch 11 at an arbitrary time to turn it on. The shutter switch 11 now generates the photographic trigger signal Son and applies it to the main controller 20 of the video camera 10. Upon receiving the photographic trigger signal Son, the main controller 20 generates the shutter release signal AgxOn, and sends it to the film camera 30, at the moment the next A field begins (namely at the leading edge of the vertical synchronizing reference signal VD).

Figure 3:
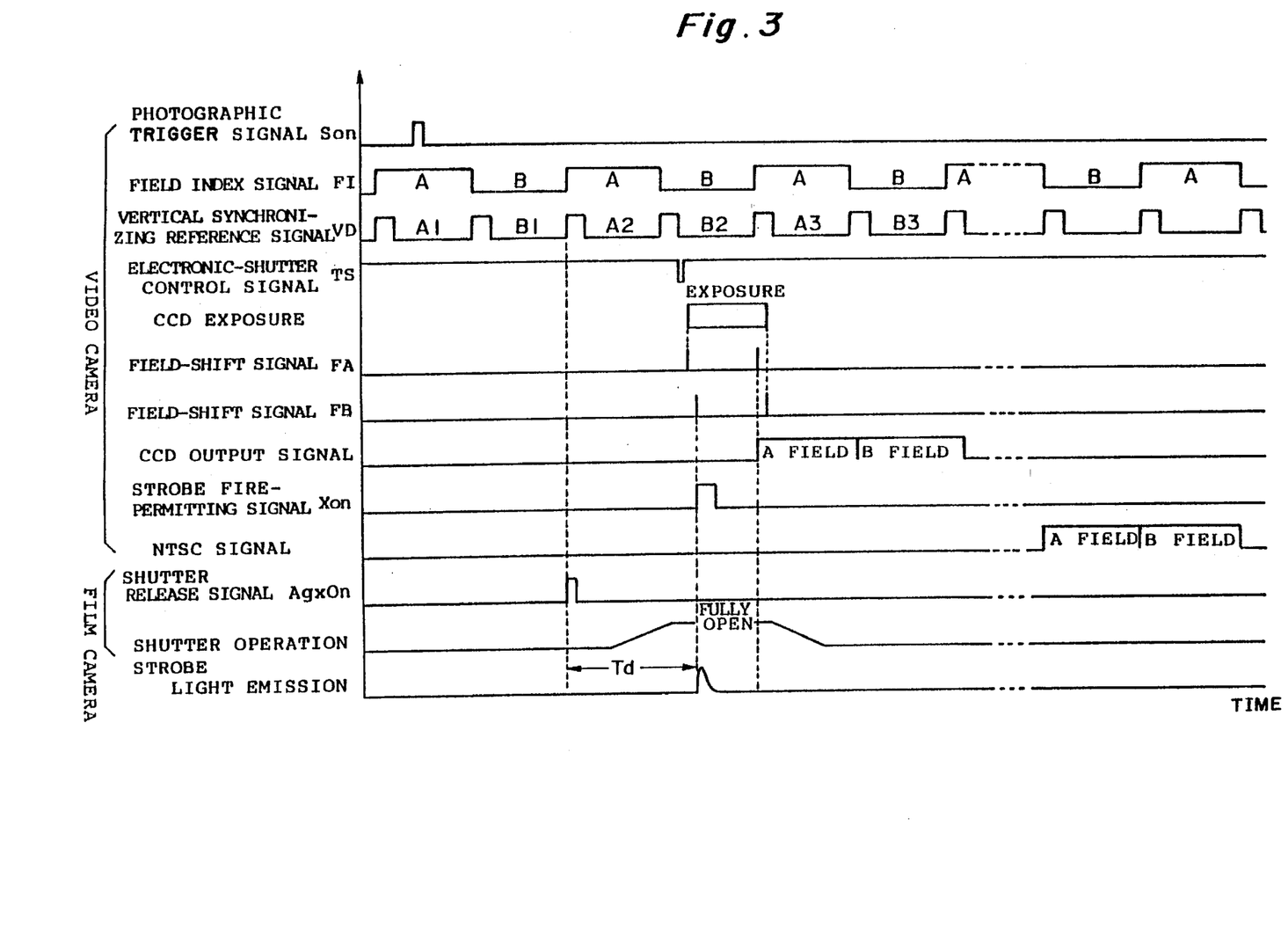
FIG. 3 is a time chart showing operation of the picture-taking system.

In FIG. 3, A2 indicates the A field in which the shutter release signal AgxOn is generated. Irrespective of the point in time at which the photographic trigger signal Son enters during the terms of A field A1 and B field B1 preceding the field A2, the shutter release signal AgxOn is always generated at the beginning of the field A2. In other words, the period of time from entry of the photographic trigger signal Son to generation of the shutter release signal AgxOn varies from 0 VD to 2 VD, depending upon the point in time at which the photographic trigger signal Son enters.

In the early part (the trailing edge of the vertical synchronizing reference signal VD) of the effective scanning interval of the B field B2 following the field A2, the main controller 20 generates the electronic-shutter control signal TS and applies it to the synchronizing signal generating circuit 15. In response to the electronic-shutter control signal TS, the synchronizing signal generating circuit 15 successively outputs to the FITCCD 12, with a slight time difference between them, the field-shift signal FA for clearing the photodiodes (the photoelectric transducers) of the A field in the FITCCD 12 and the field-shift signal FB for clearing the photodiodes of the B field. As a result, exposure (release of the electronic shutter) in the FITCCD 12 begins.

Since the time of 1 VD will have elapsed following application of the shutter release signal AgxOn to the film camera 30, the shutter in the film camera 30 will be in the fully open state and the film will have been exposed. In the period time of during which both the FITCCD 12 of the video camera 10 and the film of the film camera 30 are thus exposed, particularly at a point in time at the beginning of this time period, the synchronizing signal generating circuit 15 generates the strobe-fire permitting signal Xon, as a result of which the signal Xon is applied to the strobe light-emission device 40 via the main controller 20. The strobe-fire permitting signal Xon is generated just after the field-shift signal FB.

The strobe light-emission device 40 fires the strobe flash in response to the strobe-fire permitting signal Xon. As for the duration of the flash, the light emission ends within the interval of the field B2, particularly before the generation of the field-shift signal FA for readout of the A field. Shutter speed in the film camera 30 is determined in such a manner that the period of time during which the shutter is fully open will continue at least until the term of field B2 ends.

When the field B2 for this exposure ends and the next A field A3 begins, the field-shift signals FA and FB for readout of the signal charge from the photodiodes of the FITCCD 12 are successively generated, and applied to the FITCCD 12, by the synchronizing signal generating circuit 15 with a slight time difference between them. First, the signal charge that has accumulated in the photodiodes of the A field in FITCCD 12 is transferred to a vertical transfer line by the field-shift signal FA. The signal charge on this vertical transfer line is transferred to a storage area, which is provided in the FITCCD 12, by continuously applied high-speed transfer pulses. The signal charge of the A field that has been transferred to the storage area is output, as the video signal, from the FITCCD 12 via a horizontal transfer line over the duration of the A field A3.

After the signal charge of the A field has been transferred at high speed to the storage area, the vertical transfer line is left vacant. The signal charge that has accumulated in the photodiodes of the B field, therefore, is now transferred to the vertical transfer line by the field-shift signal FB. The signal charge on the vertical transfer line is successively transferred to the storage area at low speed over the duration of the field A3. There is also a method in which this signal charge on the vertical transfer line is transferred to the storage area at high speed at the moment the term of the field A3 ends. In either case, when the output of the A-field signal charge ends, transfer of the B-field signal charge to the storage area is completed, and the B-field signal charge of the storage area is output, as the video signal, by the FITCCD 12 via the horizontal transfer line over the duration of the next B field B3.

Thus, the signal charges of both the A and B fields accumulated in the field B2 are output by the FITCCD 12 one field at a time in the time period of the two fields A3, B3 that follow.

The video signal constituting one frame output by the FITCCD 12 is output from the video camera 10 after being subjected to signal processing in the manner described above. The resulting video signal is applied to the computer system 50.

The computer system 50 has A/D and D/A converting circuitry 51 and a disk memory 52. The NTSC signal that has entered the computer system 50 is converted to digital image data by the A/D converting circuitry 51 and the digital image data is then stored temporarily in the disk memory 52. The image data is subsequently read out of the disk memory 52 and converted to an analog video signal by the D/A converting circuitry 51. This signal is applied to the monitor display unit 60. Readout of one frame of the image data is repeated at the period of one frame and one frame of the same analog video signal is applied to the monitor display unit 60 at the period of one frame. The display unit 60 therefore displays a still picture in continuous fashion.

The output video signal of the video camera 10 can be directly applied to the display unit 60, thereby allowing the computer system 50 to be deleted. In such case the digital signal processing circuit 16 would be provided with a frame memory for storing the image data that has been subjected to digital signal processing. One frame of the image data representing a still picture would be read out of the frame memory repeatedly at a period of one frame and applied continuously to the display unit 60 via the D/A converting circuit 17 and encoder 18.

Though the video camera 10 of the foregoing embodiment is portrayed so as to operate solely in the still mode, it can also be constructed so as to change over between a movie mode and the still mode automatically. In this case the still mode is set to the period from the moment at which the photographic trigger signal Son enters to the end point of the field B3 at which the output of the B-field video signal from the FITCCD 12 ends. In the still mode, operation is performed as set forth above. The movie mode prevails at all other times. In the movie mode, the field-shift signals FA and FB may be generated every two fields or alternately every field. It may be so arranged that the moving picture being taken by the imaging optical system of the video camera 10 is displayed on the monitor display unit 60 at all times.

Figure 4:
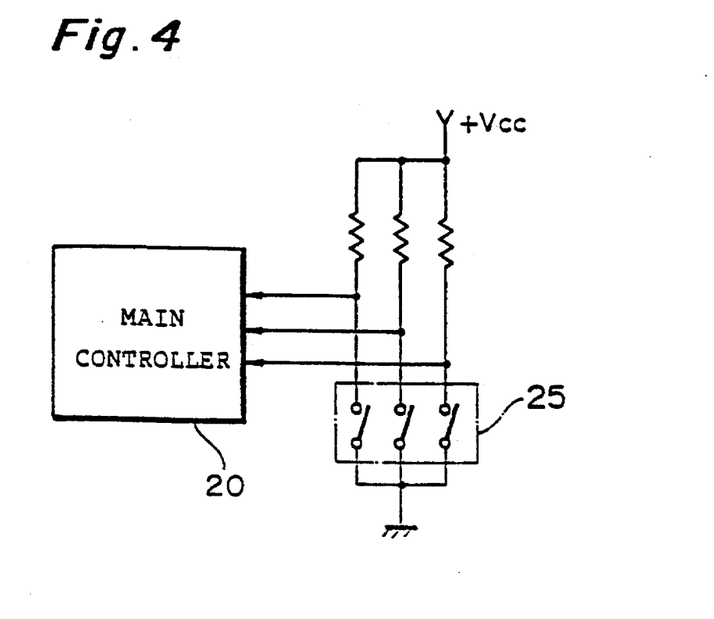
FIG. 4 is a circuit diagram showing an example in which a delay time is capable of being set.

In the foregoing embodiment, the delay time Td from the moment the shutter release signal AgxOn is applied to the moment the shutter of the film camera 30 attains the fully open state is fixed at 1 VD. There are a wide variety of delay times Td, depending upon the type of film camera. Accordingly, in order to arrange it so that delay time Td can be set at will within a fixed range (e.g., a range of from 1~8 VD), the video camera 10 may be provided with a delay-time setting switch (a DIP switch, for example) 25, as shown in FIG. 4, and a setting signal produced by the switch 25 may be fed into the main controller 20 of the video camera 10.

After generating the shutter release signal AgxOn, the controller 20 generates the electronic-shutter control signal TS when the delay time Td set by the setting switch 25 elapses. In order to arrange it so that the electronic-shutter control signal TS is always generated at the beginning of the B-field interval, it is preferred that an arrangement be adopted in which the shutter release signal AgxOn is generated at the beginning of the A field when the set delay time Td is an odd-number multiple of 1 VD and at the beginning of the B field when the set delay time Td is an even-number multiple of 1 VD.

In general, film cameras available on the market are so designed that the shutter is released when the shutter release signal AgxOn is applied, and strobe-fire permitting signal Xon is outputted at a timing suited to strobe illumination wherein the shutter is in the fully open state. It can be so arranged that the film camera function is utilized to measure the delay time Td in 1 VD units, with this measured delay time being set in the video camera.

Figure 5:
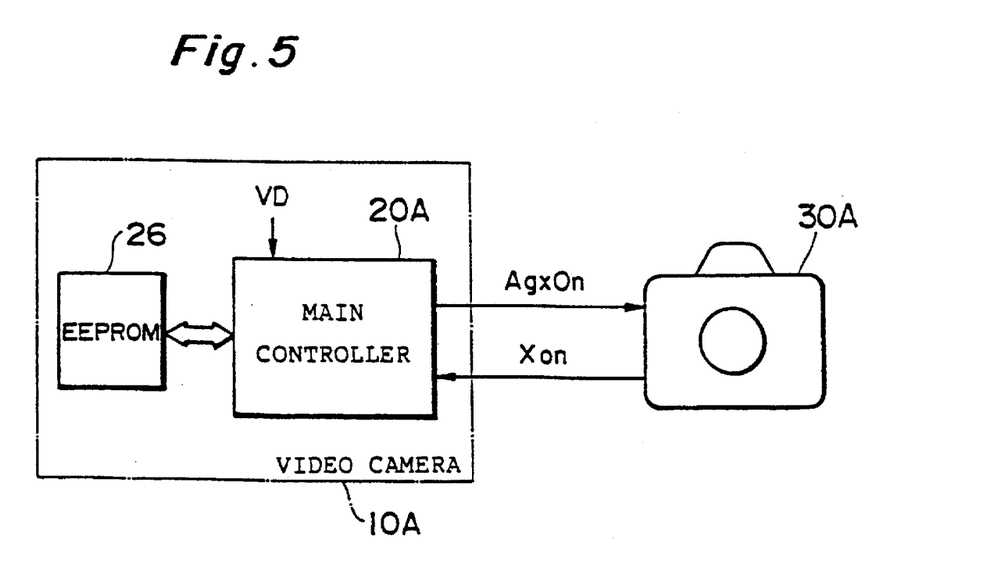
FIG. 5 is a block diagram showing a configuration for measuring the delay time.

For example, as shown in FIG. 5, a video camera 10A and a film camera 30A are connected in such a manner that the shutter release signal AgxOn from a main controller 20A of the video camera 10A is applied to the film camera 30A and the strobe light-fire permitting signal Xon outputted by the camera 30A in response is accepted by the main controller 20A. The main controller 20A of the video camera 10A measures the time from output of the shutter release signal AgxOn to acceptance of the strobe-fire permitting signal Xon by counting the vertical synchronizing signal VD and writes this measured time, or a time obtained by adding 1 VD thereto, in an EEPROM 26 peripheral to the main controller 20A.

Figure 2:
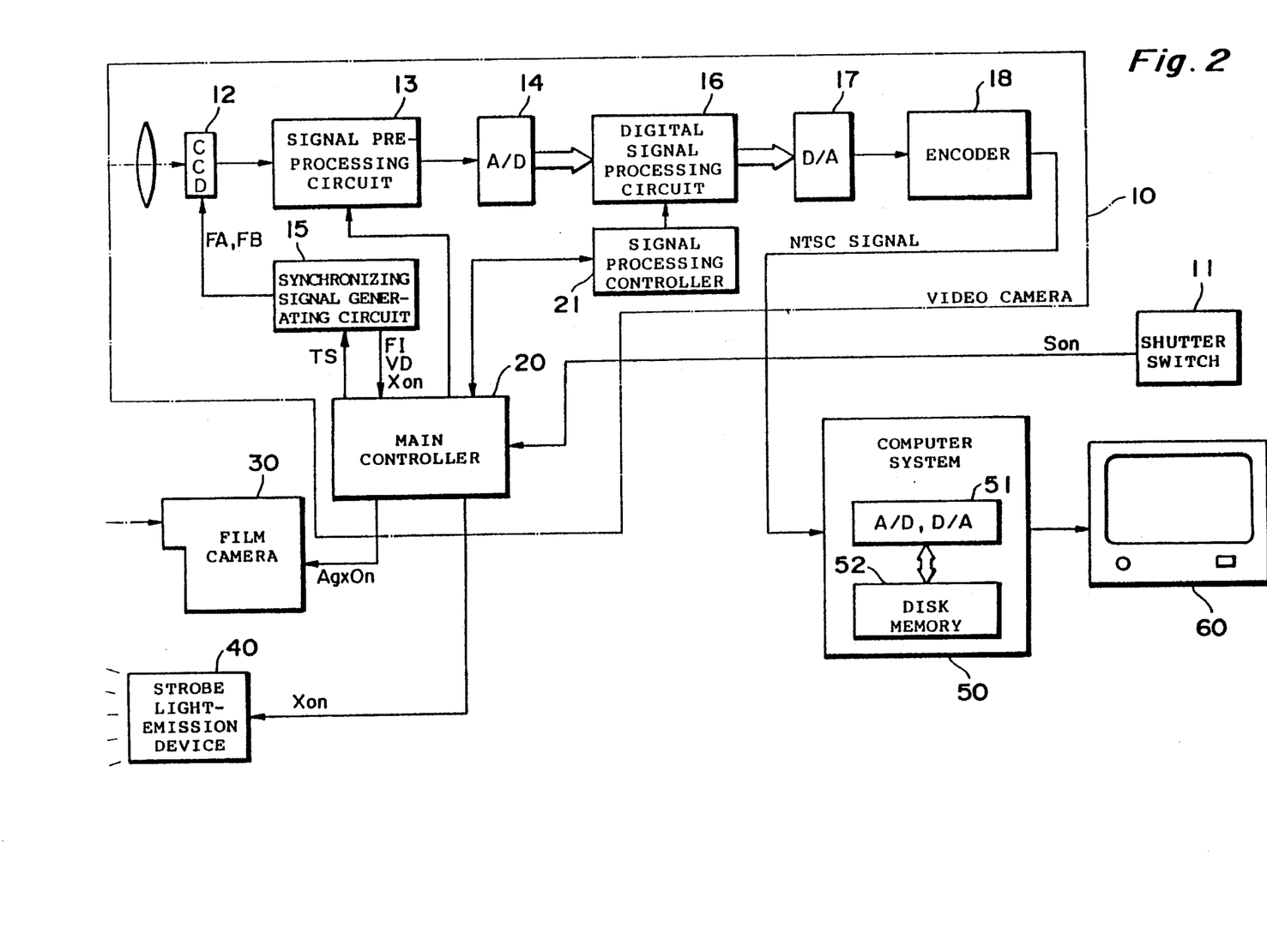
FIG. 2 is a block diagram showing the electrical configuration of a video camera.

The video camera 10A and film camera 30A are connected, as shown in FIG. 2, after this measurement of the delay time Td is finished. The main controller 20A controls the generation of the shutter relay signal AgxOn and electronic-shutter control signal TS using the delay time Td that has been written in the EEPROM 26.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A picture-taking system comprising:

a video camera having a solid-state electronic image sensing device, vertical synchronizing signal generating means for generating a vertical synchronizing signal that defines one field period in said video camera, and field-shift signal generating means responsive to an electronic-shutter control signal for generating a field-shift signal that defines an exposure time of said solid-state electronic image sensing device using the vertical synchronizing signal as a reference, wherein a video signal representing a photographic image of a subject is output by said solid-state electronic image sensing device in response to the field-shift signal;

a film camera, which has a shutter, for capturing on photographic film the photographic image of the subject incident thereon when the shutter is released in response to a shutter release signal;

a shutter switch for entering a photographic trigger signal; and a strobe light-emission device for firing a strobe flash in response to a strobe-fire permitting signal, said video camera having synchronous control means for generating the shutter release signal in synchronism with the vertical synchronizing signal in response to the photographic trigger signal that enters said video camera from said shutter switch, for generating an electronic-shutter control signal in synchronism with the vertical synchronizing signal in such a manner that said solid-state electronic image sensing device is exposed to light in a time zone when said shutter, which is released in response to the shutter release signal, is fully open, and for generating the strobe-fire permitting signal in such a manner that said strobe light-emission device fires the strobe flash during exposure of said solid-state electronic image sensing device to light.

2. The system according to claim 1, wherein said solid-state electronic image sensing device has a number of first light-receiving elements for a first field and a number of second light-receiving elements for a second field arranged in close proximity to respective ones of said first light-receiving elements;

said field-shift signal generating means generating the field-shift signals in such a manner that a timing at which said first light-receiving elements are cleared and a timing at which said second light-receiving elements are cleared are made slightly different from each other, a readout timing for reading signal charge out of said first light-receiving elements and a readout timing for reading signal charge out of said second light-receiving elements are made slightly different from each other, and said first and second light-receiving elements are capable of being exposed in an essentially common time period in one field interval.

3. The system according to claim 1, wherein said video camera comprises delay-time setting means for setting a delay time from a moment at which the shutter release signal is applied to a moment at which said shutter is opened fully in said film camera;

said synchronous control means generating the shutter release signal and the electronic-shutter control signal on the basis of the delay time set by said delay-time setting means.

4. The system according to claim 1, further comprising a display unit for displaying the photographic image of the subject represented by the video signal output by said video camera.

5. In a picture-taking system having
a video camera including a solid-state electronic image sensing device, vertical synchronizing signal generating means for generating a vertical synchronizing signal that defines one field period in said video camera, and field-shift signal generating means responsive to an electronic-shutter control signal for generating a field-shift signal that defines an exposure time of said solid-state electronic image sensing device using the vertical synchronizing signal as a reference, wherein a video signal representing a photographic image of a subject is output by said solid-state electronic image sensing device in response to the field-shift signal,
a film camera, which has a shutter, for capturing on photographic film the photographic image of the subject incident thereon when the shutter is released in response to a shutter release signal,
a shutter switch for entering a photographic trigger signal, and
a strobe light-emission device for firing a strobe flash in response to a strobe-fire permitting signal,
a picture taking method comprising the steps of:
measuring in advance a delay time from a moment at which the shutter release signal is applied to a moment at which said shutter is opened fully in response to the shutter release signal;
setting a time from generation of the shutter release signal to generation of an electronic-shutter control signal to a time corresponding to the delay time; and
controlling said video camera to generate the shutter release signal, the electronic-shutter control signal and the strobe-fire permitting signal, in synchronism with the vertical synchronizing signal, in response to a photographic trigger signal generated by said shutter switch, in such a manner that said solid-state electronic image sensing device is exposed to light in a time zone when said shutter, which is released in response to the shutter release signal, is fully open, and such that said strobe-light emission device fires the strobe in response to the strobe-fire permitting signal during exposure of said solid-state electronic image sensing device to light.

6. The method according to claim 5, said solid-state electronic image sensing device performs to pseudo-frame photography and exposure of said solid-state electronic image sensing device is completed within one field interval.

7. The method according to claim 5, further comprising the steps of:
applying the shutter release signal to said film camera;
accepting the generated strobe-fire permitting signal from said film camera in response to the shutter release signal; and
measuring the delay time by clocking time from a moment at which the shutter release signal is applied to a moment at which the strobe-fire permitting signal is accepted, using the period of the vertical synchronizing signal as a unit for clocking.

8. The method according to claim 5, wherein the video signal output by said video camera is applied to a display unit and the image represented by the video signal is displayed on said display unit.

9. The system according to claim 1, wherein said film camera includes a shutter release signal terminal for receiving the shutter release signal from said video camera, said film camera and said video camera being separately implemented.

10. The system according to claim 3, wherein the delay time is set as a positive whole-number multiple of a period of the vertical synchronizing signal.

11. The method according to claim 5, wherein said film camera receives the shutter release signal from said video camera via a shutter release signal terminal of said film camera, said film camera and said video camera being implemented separately.

* * * * *